United States Patent
Patridge

(12) 
(10) Patent No.: US 6,397,992 B1
(45) Date of Patent: Jun. 4, 2002

(54) INNER HUB FOR CLUTCH/BRAKE

(76) Inventor: Arthur G. Patridge, 148 Valley Oaks Dr., Advance, NC (US) 27006

( * ) Notice: Subject to any disclaimer, the term of this patent is extended or adjusted under 35 U.S.C. 154(b) by 0 days.

(21) Appl. No.: 09/568,109

(22) Filed: May 10, 2000

Related U.S. Application Data

(60) Provisional application No. 60/142,792, filed on Jul. 8, 1999.

(51) Int. Cl.[7] .............................................. F16D 67/02
(52) U.S. Cl. ...................... 192/15; 192/18 R; 192/93 A; 56/11.3
(58) Field of Search ................................ 192/18 R, 15, 192/93 A, 16, 110 B, 70.16; 56/11.3

(56) References Cited

U.S. PATENT DOCUMENTS

| | | | |
|---|---|---|---|
| 4,205,509 A | * 6/1980 | Miyazawa et al. ..... | 192/18 R X |
| 4,286,701 A | * 9/1981 | MacDonald ............... | 192/18 R |
| 4,372,433 A | * 2/1983 | Mitchell et al. .......... | 192/18 R |
| 4,377,224 A | * 3/1983 | Takata et al. .............. | 192/18 R |
| 4,524,853 A | * 6/1985 | Nagai ....................... | 192/18 R |
| 4,538,712 A | * 9/1985 | Nagai ....................... | 192/18 R |
| 5,033,595 A | * 7/1991 | Pardee ...................... | 192/18 R |
| 5,570,765 A | 11/1996 | Patridge | |
| 5,749,208 A | 5/1998 | Wuebbels et al. | |

* cited by examiner

Primary Examiner—Saul Rodriguez
(74) Attorney, Agent, or Firm—Michael Best & Friedrich LLP

(57) ABSTRACT

A single component inner hub adapted to engage the drive shaft of an engine, support a transaxle pulley and serve as the inner hub of a clutch/brake assembly, the inner hub having a first end, a second end, an exterior surface extending between the first and second ends, the exterior surface including an upper portion adjacent the first end of the inner hub, an intermediate portion which is adjacent the first portion and which has a circumference that is smaller than that of the upper portion, an axially facing shoulder extending between the upper and lower portions of the exterior surface and a lower portion that is externally threaded and that extends between the intermediate portion and the lower end of the inner hub, the inner hub also having extending between the first and second ends a bore having an upper portion adapted to receive the lower end of the drive shaft to rotationally fix the inner hub to the shaft, the bore also including a lower portion of the bore having an internal diameter smaller than that of the upper portion of the bore.

10 Claims, 1 Drawing Sheet

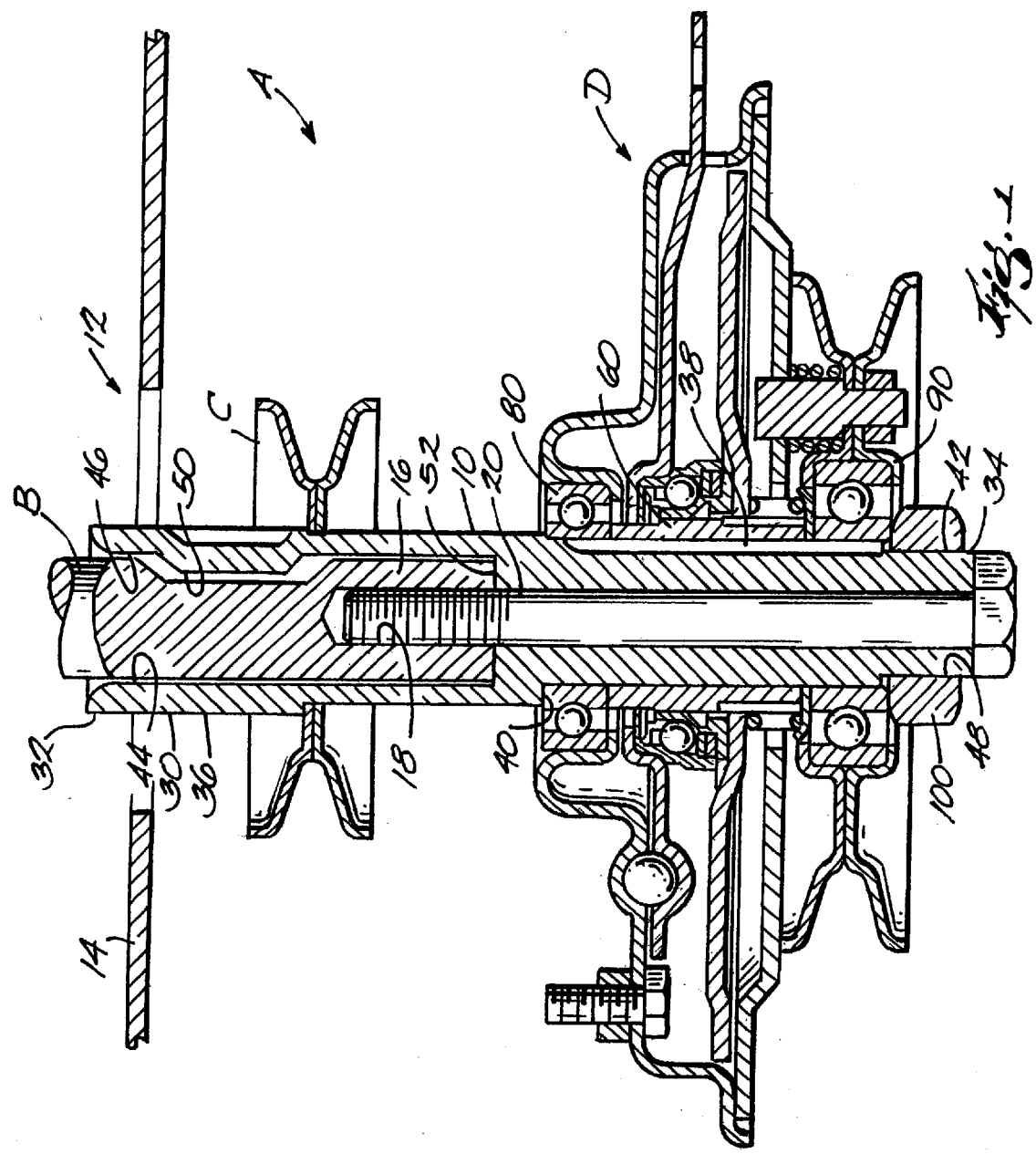

INNER HUB FOR CLUTCH/BRAKE

This application claims the benefit of U.S. Provisional Application No. 60/142,792, filed Jul. 8, 1999.

TECHNICAL FIELD

The invention generally relates to torque transmission assemblies, and particularly to clutch/brake assemblies

RELATED PRIOR ART

It is known to provide a small engine with a clutch/brake assembly for use in connection with lawn mowers and the like. The clutch/brake assembly may include an electro-mechanical clutch or a purely mechanical clutch. U.S. Pat. No. 5,570,765 discloses one such type of clutch/brake assembly. In such applications, it is typical for the engine to include a drive shaft that is arranged in a vertically extending position that is operably connected through the clutch/brake assembly with a mower blade. In such applications, it is also known to utilize the drive shaft for powering the mower by providing a driven connection between a transaxle and the drive shaft. This driven connection between the transaxle and the drive shaft can, for example, be provided by a transaxle pulley fixed to the drive shaft.

SUMMARY OF THE INVENTION

Known driving arrangements including a clutch/brake assembly and a drive shaft of an engine often use multiple, separate components to drivingly connect the drive shaft, the clutch/brake, and the transaxle pulley. These multiple components accommodate the arrangement of the transaxle, location of the mower chassis and of the engine. The use of multiple components to drivingly connect these components of a mower adds cost to the manufacture and service of the mower.

The invention provides a single component that engages the drive shaft of an engine, supports a transaxle pulley and serves as the inner hub of a clutch/brake assembly. The configuration of the inner hub embodying the invention permits the use of a single component which replaces multiple components yet performs the functions of the multiple components. The invention thus reduces the costs of manufacture of a mower using a clutch/brake assembly associated with a transaxle drive, and reduces the number of parts that must be maintained in an inventory used for either manufacture or servicing of such mowers.

Various other features and advantages of the invention will become apparent to those skilled in the art upon review of the following detailed description, claims and drawings.

DESCRIPTION OF THE DRAWINGS

FIG. 1 is a cross-sectional view of an inner hub which embodies the invention and which is used in connection with a clutch/brake assembly and transaxle drive.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

FIG. 1 illustrates a portion of a drive system A for a vehicle, such as a mower providing an internal combustion engine (not shown) having a drive shaft B, and an inner hub 10 embodying the invention for connecting the drive shaft B to a transaxle pulley C and a brake/clutch assembly D. The inner hub 10 as illustrated in FIG. 1, may be used in many applications. However, for purposes of illustration, the invention will be discussed in connection with a lawn mower.

The drive shaft B is driven by and extends downward from the engine through an opening 12 in a mower chassis 14. The drive shaft B is cylindrical and has a slotted end 16 that is surrounded by and rotationally fixed to the inner hub 10 in a manner discussed below. The end 16 of the drive shaft B has extending therein a threaded bore 18 and is adapted to receive a bolt 20 which axially fixes the inner hub 10 to the drive shaft B.

The transaxle pulley C is located below the mower chassis 14 and is fixed to and rotationally driven by the inner hub 10 which, in turn, is driven by the drive shaft B in a manner discussed below.

The clutch/brake assembly D can be of any suitable type of assembly, e.g., a system of pulleys, an electrically operable clutch/brake assembly or a mechanically operable clutch/brake assembly. Further in this regard, while any suitable clutch/brake assembly can be used in conjunction with the inner hub 10, in the illustrated embodiment, the clutch/brake assembly D embodies the construction of the clutch/brake assembly disclosed in U.S. Pat. No. 5,570,765 which is incorporated in its entirety by reference.

The inner hub 10 is a single piece component that is elongated and couples the drive shaft B to the transaxle pulley C, and serves as a component of the clutch/brake assembly D. The inner hub 10 includes a generally cylindrical exterior surface 30 that extends between a first or upper end 32 which receives the drive shaft B and a second or lower end 34 which extends through the clutch/brake assembly D. The exterior surface 30 includes a first or upper portion 36 adjacent the first, upper end 32 of the inner hub 10. The external surface 30 of the inner hub 10 also provides a second or intermediate portion 38 which is adjacent the upper portion 36 and which has a circumference that is smaller than that of the upper portion 36. The exterior surface 30 also includes an axially downwardly facing shoulder 40 located at the transition between the upper and lower portions of the exterior surface. The external surface also includes a third or lower portion 42 that is externally threaded and that extends between the intermediate portion 38 and the lower end 34 of the inner hub 10.

The inner hub 10 also has extending through its entire length a bore 44 having an upper portion 46 and a lower portion 48. The upper portion 46 of the bore 44 is sufficiently large and long to receive the lower end of the drive shaft B, and includes an inwardly extending key 50 which engages the slotted lower end of the drive shaft B to rotationally fix the inner hub 10 to the drive shaft B.

The lower portion 48 of the bore 44 has an internal diameter smaller than that of the upper portion 46 of the bore 44 and is sized to receive the bolt 20. An axially upwardly facing internal shoulder 52 extends between the upper and lower portions of the bore 44 and engages the lower face of the shaft B. The bolt 20 extends through the bore 44, is threaded into the threaded lower end of the drive shaft B and has a head that engages the lower end 34 of the inner hub 10. The bolt 20 draws the internal shoulder 52 tight against the lower end of the drive shaft B so that the lower end of the drive shaft B bottoms out and engages the internal shoulder 52 in the interior of the inner hub 10. The inner hub 10 thus serves to precisely locate the position of the transaxle pulley C mounted on the inner hub 10 relative to the end 16 of the drive shaft B.

In the illustrated arrangement of the drive system A, the clutch/brake assembly D includes an inner collar or bearing sleeve 60 which surrounds the lower portion of the inner hub 10 and which is rotationally fixed to the inner hub 10. The inner collar 60 includes upper and lower ends and a bore extending therethrough between the upper and lower ends. The collar thus provides an internal surface and an external surface. The internal surface slidably contacts the intermediate portion 38 of the inner hub's external surface 30. The collar 60 and inner hub 10 can be rotationally fixed by any suitable means, whether by engaging splined surfaces or by a slot and key arrangement. It should also be appreciated that the clutch/brake assembly D may be replaced with an electric clutch/brake assembly.

The brake/clutch assembly D also includes an upper bearing assembly 80 having an inner race that engages the intermediate portion 38 of the inner hub's external surface 30. The inner race of the upper bearing assembly 80 engages the upper edge of the collar 60 and, as described below, engages the external shoulder 40 on the inner hub 10 by the engagement of a nut on the threaded lower end 42 of the inner hub 10. The brake/clutch assembly D also includes a lower bearing assembly 90 having an inner race that engages the intermediate portion 38 of the inner hub's external surface 30 adjacent the lower end 42 of the inner hub 10. The inner race of the lower bearing assembly 90 also engages the lower end of the collar 60.

The clutch/brake assembly D also includes a locking nut 100 that is threaded onto the lower end 42 of the inner hub 10. The locking nut 100 engages the inner race of the lower bearing assembly 90 which, in turn, engages the collar 60. In turn, the inner race of the upper bearing assembly 80 is drawn tight against the external shoulder 40 on the inner hub 10 by the engagement of the nut 100 on the threaded lower end 42 of the inner hub 10. The external shoulder 40 of the inner hub 10 thus serves to precisely locate the clutch/brake assembly D on the inner hub 10 and, therefore, the transaxle pulley C. As a consequence, when the inner hub 10 is fixed to the end of the drive shaft B by means of the bolt 20, the clutch/brake assembly D is then precisely located relative to the end of the drive shaft B.

The brake/clutch assembly D also includes a brake member fixed to the mower chassis 14, an input disc driven by the drive shaft B through the inner hub 10, an output disc moveable axially relative to the inner hub 10 and drive shaft B and rotatable relative thereto and an output pulley mounted at the lower end of the inner hub 10 by means of the outer race of the lower bearing assembly 90.

While only a single embodiment of the invention has been illustrated and described, it is not intended to be limited thereby, but only by the scope of the appended claims.

Various features of the invention are set forth in the following claims.

What is claimed is:

1. A lawn mower comprising:
   a chassis having an aperture;
   an engine coupled to said chassis and having an output shaft extending through said aperture;
   a clutch/brake assembly coupled to said chassis;
   a single-piece inner hub extending at least partially into said clutch/brake assembly;
   a bearing positioned around a portion of said inner hub and having an inner race substantially fixed with respect to said inner hub, said bearing also having an outer race rotatable with respect to said inner race and coupled to a portion of said clutch/brake assembly such that said inner hub and said inner race are rotatable with respect to said outer race and said portion of said clutch/brake assembly;
   a transaxle pulley affixed to said inner hub; and
   a fastener, wherein said inner hub includes first and second adjacent portions, said second portion having a smaller outer diameter than said first portion, said inner hub also including an exterior bearing shoulder defined substantially at the transition between said first and second portions, and wherein said fastener forces said inner race toward said bearing shoulder to substantially prevent rotation of said inner race with respect to said inner hub.

2. The lawn mower of claim 1, wherein said inner hub further includes a threaded portion, and wherein said fastener is a nut threaded onto said threaded portion.

3. The lawn mower of claim 1, further comprising a bearing sleeve positioned around said second portion of said inner hub and sandwiched between said fastener and said inner race.

4. A lawn mower comprising:
   a chassis having an aperture;
   an engine coupled to said chassis and having an output shaft extending through said aperture;
   a clutch/brake assembly coupled to said chassis;
   a single-piece inner hub extending at least partially into said clutch/brake assembly;
   a bearing positioned around a portion of said inner hub and having an inner race substantially fixed with respect to said inner hub, said bearing also having an outer race rotatable with respect to said inner race and coupled to a portion of said clutch/brake assembly such that said inner hub and said inner race are rotatable with respect to said outer race and said portion of said clutch/brake assembly; and
   a transaxle pulley affixed to said inner hub;
   wherein said inner hub includes a longitudinal bore having a large diameter portion, a small diameter portion, and an internal shaft shoulder defined substantially at the transition between said large and small diameter portions, said output shaft extending into said large diameter portion of said bore and abutting said shaft shoulder.

5. The lawn mower of claim 4, further comprising a bolt extending into said bore and threaded into said output shaft to draw said output shaft against said shaft shoulder and couple said output shaft to said inner hub.

6. An assembly for transmitting torque from a rotating output shaft to a clutch/brake mechanism, the assembly comprising:
   a one-piece hub having a longitudinal bore adapted to receive the output shaft;
   a bearing positioned around said hub and having an inner race rotationally fixed with respect to said hub and an outer race adapted to be rotationally fixed with respect to the clutch/brake assembly to permit rotation of said hub and inner race with respect to said outer race and the clutch/brake assembly; and
   a transaxle pulley affixed to said hub for rotation therewith;
   wherein said bore includes a large diameter portion, a small diameter portion, and a shaft shoulder defined substantially at the transition between said large and small diameter portions, said large diameter portion being adapted to receive the output shaft and said shaft shoulder adapted to abut the output shaft.

7. An assembly for transmitting torque from a rotating output shaft to a clutch/brake mechanism, the assembly comprising:

a one piece hub having a longitudinal bore adapted to receive the output shaft;

a bearing positioned around said hub and having an inner race rotationally fixed with respect to said hub and an outer race adapted to be rotationally fixed with respect to the clutch/brake assembly to permit rotation of said hub and inner race with respect to said outer race and the clutch/brake assembly; and a transaxle pulley affixed to said hub for rotation therewith;

wherein said hub includes first and second adjacent portions, said second portion having a smaller outer diameter than said first portion and being adapted to extend into the clutch/brake assembly, said hub also including an exterior bearing shoulder defined substantially at the transition between said first and second portions, and wherein said inner race of said bearing is forced toward said bearing shoulder to resist relative rotation between said inner race and said hub.

8. The assembly of claim 7, further comprising a fastener and a bearing sleeve, said bearing sleeve being positioned around said second portion of said hub and being sandwiched between said fastener and said inner race of said bearing.

9. The assembly of claim 8, wherein said hub includes a threaded portion and wherein said fastener is a nut threaded onto said threaded portion.

10. A lawn mower comprising:

a chassis having an aperture;

an engine coupled to said chassis and having an output shaft extending through said aperture;

a clutch/brake assembly coupled to said chassis;

a single-piece inner hub extending through said clutch/brake assembly, said inner hub including first, second, and third portions, said second portion having a smaller outer diameter than said first portion, said inner hub also including an exterior bearing shoulder defined substantially at the transition between said first and second portions, said third portion being threaded, said inner hub also including a longitudinal bore extending therethrough, said bore having a large diameter portion and a small diameter portion, said inner hub further including an internal shaft shoulder defined substantially at the transition between said large and small diameter portions, said output shaft extending into said large diameter portion and abutting said shaft shoulder;

a transaxle pulley affixed to said inner hub;

a first bearing positioned around said second portion of said inner hub and having an inner race and an outer race rotatable with respect to said inner race and rotatably fixed with respect to a portion of said clutch/brake assembly;

a second bearing positioned around said second portion in spaced-apart relation to said first bearing, said second bearing including an inner race;

a bearing sleeve positioned around said second portion of said inner hub between the inner races of said first and second bearings;

a nut threaded onto said third portion of said inner hub to drive said inner race of said second bearing, said bearing sleeve, and said inner race of said first bearing toward said bearing shoulder to substantially rotatably fix said inner race of said second bearing, said bearing sleeve, and said inner race of said first bearing with respect to said inner hub; and a bolt extending into said longitudinal bore and threaded into said output shaft to draw said output shaft against said shaft shoulder to rotatably fix said output shaft and said inner hub with respect to each other.

* * * * *